Aug. 7, 1945.   H. A. STRICKLAND, JR   2,381,143
INDUCTOR APPARATUS
Filed Aug. 11, 1943   2 Sheets-Sheet 1
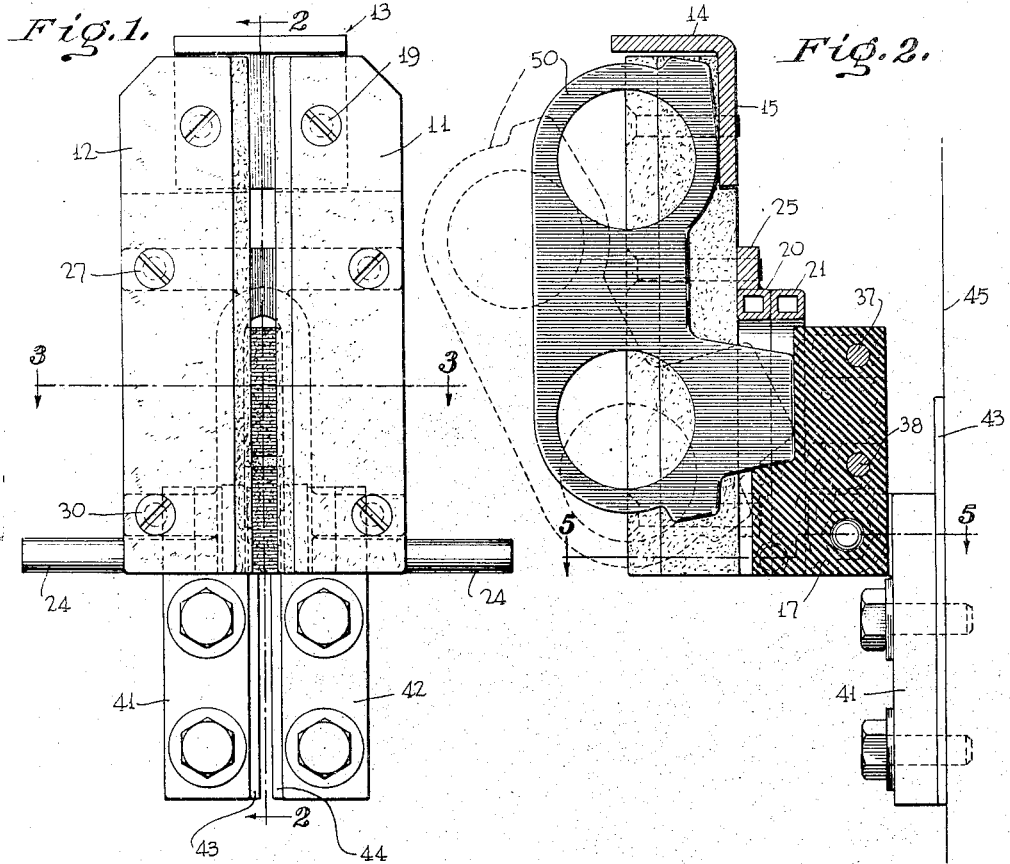
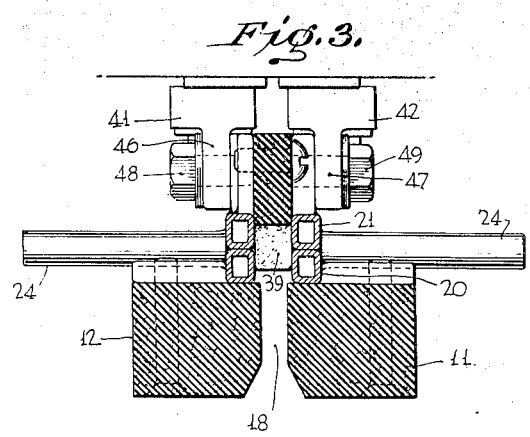
INVENTOR
Harold A. Strickland Jr.
BY John P. Farba
ATTORNEY Aug. 7, 1945. H. A. STRICKLAND, JR 2,381,143
INDUCTOR APPARATUS
Filed Aug. 11, 1943 2 Sheets-Sheet 2

INVENTOR
Harold A. Strickland Jr.
BY
ATTORNEY

Patented Aug. 7, 1945

2,381,143

UNITED STATES PATENT OFFICE 2,381,143

INDUCTOR APPARATUS

Harold A. Strickland, Jr., Detroit, Mich., assignor to Budd Wheel Company, Philadelphia, Pa., a corporation of Pennsylvania Application August 11, 1943, Serial No. 498,160

8 Claims. (Cl. 219—13)

This invention relates to inductive heating apparatus and more particularly to inductive apparatus suitable for the heating and automatic removal of small ferro-magnetic plates or the like.

Among the objects of the invention are to provide means for heat treating a magnetic plate which is semi-automatic in its operation. Another object is to provide self-timing means in connection with the inductive heating of iron plates and the like. Still another object is to provide a mechanism for heating small articles of uniform size and shape which may be continuously operated without modification of the electrical circuits involved. Additional objects include the provisions of means for supporting off-center an object to be heated to facilitate gravitational displacement after the heating operation; the provision of heating means which includes self-centering means for rapid placement of the articles to be heated in heating position; the provision of heating means having a novel mode of support adjustment to permit variation in the center of mass of the article being heated with reference to the supporting structure; and the provision of a heating unit having unusual simplicity of arrangement and limitation in number of parts.

Reference is made to the following description for a disclosure of the invention, which may be preferred, and to the accompanying drawings, in which:

Fig. 1 is a front elevation of the inductor unit;

Fig. 2 is a section along line 2—2 of Fig. 1;

Fig. 3 is a plan section along line 3—3 of Fig. 1;

Figure 4:
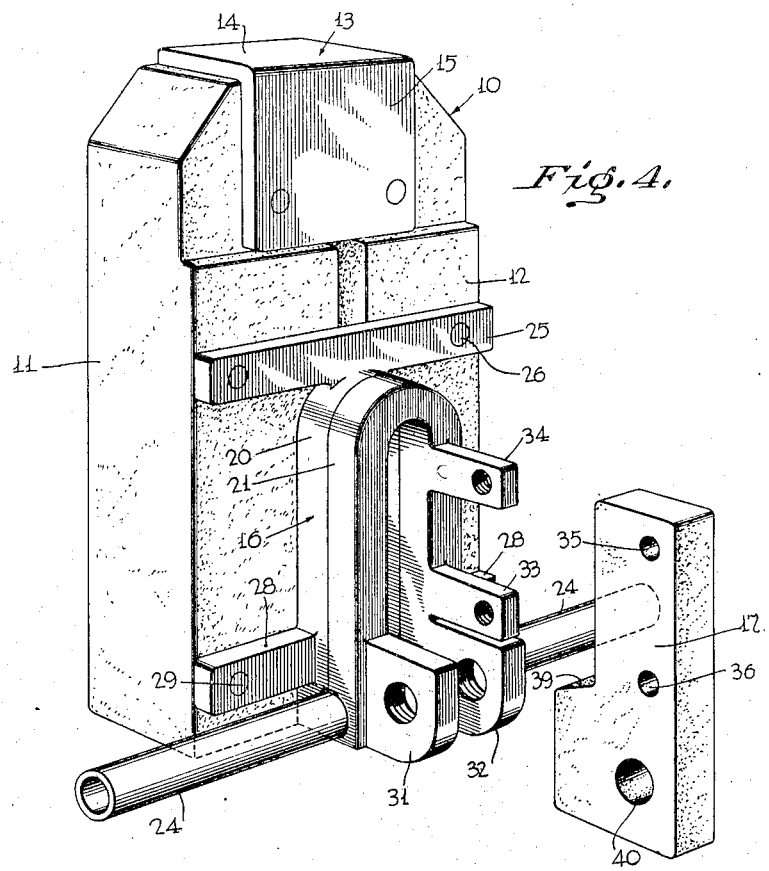
Fig. 4 is a perspective of the heating unit showing the buffer block in disengaged position.

Generally speaking, the simplified heating unit 10 is comprised of five elements, the upstanding and relatively massive guide blocks 11 and 12 made of insulation material such as asbestos-containing compositions, and which form a substantial part of the structure; the top bridge plate 13 which is right-angled including a flat top section 14 and vertical section 15 overlying the upper rear portion of the adjoining guide blocks 11 and 12 and secured thereto; the combined holding and primary induction unit 16 which supplies the power to the workpieces and also bridges the guide blocks 11 and 12 to hold the same in a rigid unitary structure; and the buffer or holding block 17, likewise of insulation material, which is interposed between sections of the primary coil and in alignment with the vertical workpiece cavity to receive the shock of the in-coming workpieces, and to assist in the supporting of the same during the heating operation.

Giving more detailed consideration to the structure, the two main guide blocks 11 and 12 are positioned vertically in parallel relationship as clearly shown in Figs. 1 and 4, there being between these blocks a cavity 18, which is adapted for the reception of the flat metal workpieces in the heating operation. At the top of the structure the blocks 11 and 12 are fixedly spaced by means of the angled bridge plate 13 previously referred to, screws 19 serving to fasten the insulation blocks against the metal plate in fixed relationship thereto.

The base sections of the blocks 11 and 12 are fixedly spaced as in the upper section by means of the secondary unit 16. As clearly shown in perspective in Fig. 4, this secondary unit includes two U-shaped turns 20 and 21 of hollow cross section, each being square in its general outline and combined in juxtaposition to form a single primary inductive element. The base end of these two turns 20 and 21 are combined in a single space 22 having a common opening 23 by means of which and the attached conduit 24, connection is made to a source of liquid coolant as well as of electrical power. It is apparent by this construction that the turns 20 and 21 of the inductor unit are in parallel relationship both as to cooling and as to electrical conduction.

Secured to the turns 20 and 21 of the inductor unit are a number of attachment plates and bars. At the top of turn 20 is fixed a cross bar 25 apertured at 26 to receive the holding screws 27 passing through the insulation blocks 11 and 12. Near the base ends of the primary turn 20 on either side thereof are outwardly extending attachment bars 28 apertured at 29 to receive the holding screws 30 also passing through the insulation blocks 11 and 12. To the outer turn 21 of the inductor adjacent the base of either arm of the turn are fixedly mounted lugs 31 and 32, the same extending rearwardly and being transversely apertured and screw threaded to form adjustable pivot supports for the heating unit as a whole as will be more fully described hereinafter. On the arm of the induction turn 21 which supports a lug 32 is also positioned rearwardly extending support rods 33 and 34, these rods being likewise apertured.

Adapted to be inserted in the space between lugs 31 and 32 and between the adjacent arms of the inductor unit is a buffer block 17. This block is roughly L-shaped and is provided with openings 35 and 36 adapted to register with the openings in the support rods 33 and 34 for the reception of holding screws 37 and 38, whereby the buffer plate is held firmly in position between and to the rear of the inductor coil. The lower enlarged section of the buffer plate extends forwardly to form a ledge or shoulder 39 which is inclined downwardly toward the forward face of the workpiece cavity. This inclined shoulder 39 is adapted for the reception of the lower supporting end of the workpiece when it is inserted in the workpiece cavity for heat treatment. An aperture 40 near the base of the block 17 is adapted for registry with the apertures formed in the lugs 31 and 32.

Figure 5:
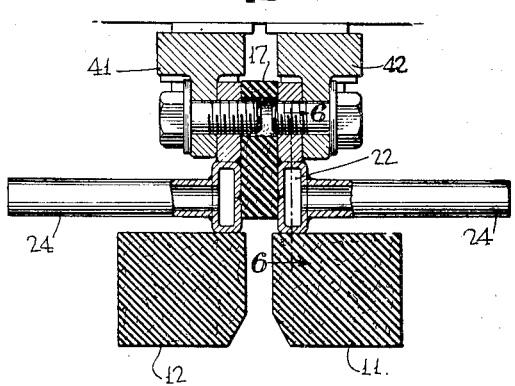
Fig. 5 is a sectional detail along line 5—5 of Fig. 2.
Figure 6:
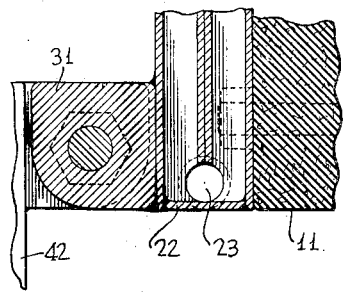
Fig. 6 is a further sectional detail along line 6—6 of Fig. 5.

The unit as a whole is supported in any convenient manner as desired, depending upon the requirements of the particular manufacturing operation. A satisfactory support is as indicated in Figs. 1 and 2, in which parallel straps 41 and 42 are vertically positioned on supporting plates 43 and 44 on a wall surface 45. The upper ends of each of these straps are formed with outwardly projecting lugs 46 and 47 transversely apertured to receive the bolts 48 and 49. The apertures of the lugs 46 and 47 and those of the lugs 31 and 32 are placed in alignment and the bolts 48 and 49 passing through these apertures and making screw threaded engagement with lugs 31 and 32, serve to securely but adjustably attach the inductor unit 10 to the wall support. It is noted that the lugs 31 and 32 of the inductor unit are positioned within the lugs 46 and 47 of the wall bracket as shown in Fig. 5.

It is pointed out further that the guide blocks 11 and 12 are chamfered on the outer edges of the workpiece cavity so that a degree of tolerance is provided for the operator in the placing of the workpiece within the workpiece gap for heat treatment. It is also observed that the structure of the unit is such in relation to the workpiece that on the placement of the workpiece within the workpiece gap 18, the upper inner edge of the workpiece plate contacts with the metal of the bridge plate 13, whereas the lower end of the workpiece engages the softer insulation substance of the buffer block 17. Since usually first contact is made at the upper end of the workpiece, since the bridge plate is further to the front of the unit than the buffer block, the greater shock and wear of the apparatus is taken by the more resistant metal of the bridge plate than the softer material of the buffer block.

In operating the apparatus as described, the workpiece in the shape, for example, of a tank tread plate 50 is grasped by the operator and rapidly inserted in the workpiece cavity 18 as shown in Fig. 2 of the drawings, the upper portion of the plate engaging the bridge plate 13 and the lower portion engaging and seating on the ledge 39 of the buffer plate 17. Electric power and cooling fluid having been previously applied to the turns of the primary inductor 16, the electromagnetic effect of the inductor is to magnetize the ferro-magnetic material of the workpiece plate 50 at the point primarily of insertion within the turns of the inductor coil and thus the workpiece plate is held firmly within the unit irrespective of the fact that the center of mass of the workpiece is substantially displaced outwardly from the point of support on the offset ledge 39 of the buffer plate. The heating action continues until the section of the workpiece enclosed by the inductor coil is heated up to the temperature of recalescence, whereupon the magnetic holding effect disappears and the workpiece falls by gravity into a quenching medium positioned directly beneath the unit or into a chute or conveyor, which carries the workpiece to a quenching medium. As soon as one plate falls from the heating unit, a second plate is inserted in the heating cavity to be held by the magnetic action of the current. The heating process and automatic ejection of the workpiece is repeated as long as the operator desires.

The structure as described is, of course, subject to modification as to details, these being dependent upon the precise form of the workpiece and other variable conditions of operation, and hence no limitations are implied in the particular disclosure as made, the invention being comprehended within the following claims.

What is claimed is:

1. In an inductive heating unit, a combined workpiece retaining and heating coil, means for guiding the workpiece into operative relationship to said heating coil, means for arresting the movement of said workpiece in its movement through said coil at the point where the workpiece is in a state of unstable gravitational equilibrium and where a part only of said workpiece is subjected to inductive heating, and means for supplying electrical energy to said coil.

2. An electrical inductive heating unit comprising a support, means for securing parallel insulation blocks to said support, said blocks being laterally spaced from each other to form a work-receiving cavity, a coil secured to said blocks on one side of said cavity, a stop positioned adjacent said coil to include the coil between itself and said blocks, said stop having a supporting ledge for giving partial support only to a workpiece insertable through said cavity into the coil area.

3. An electrical inductive heating unit comprising a support, means for securing parallel insulation blocks to said support, said blocks being laterally spaced from each other to form a work receiving cavity, a coil secured to said blocks on one side of said cavity, a stop positioned adjacent said coil to include the coil between itself and said blocks, said stop having a supporting ledge for giving partial support only to a workpiece insertable through said cavity into the coil area, and means for adjustably mounting the unit formed by said support blocks, coil and stop.

4. An electrical inductive heating unit comprising a support for said heating unit, two insulation blocks laterally displaced to form a workpiece heating cavity, a heating coil positioned on the rear side of said cavity, workpiece stops secured behind said cavity, and means for assembling said blocks, coil and stops on said support.

5. An electrical inductive heating unit comprising a support for said heating unit, two insulation blocks laterally displaced to form a vertical workpiece heating cavity, a heating coil positioned on the rear side of said cavity, upper and lower workpiece stops secured behind said cavity, and means for assembling said blocks, coil and stops on said support, said upper stop being positioned forwardly of said lower stop.

6. An electrical inductive heating unit comprising a support for said heating unit, two parallel insulation blocks laterally displaced to form a workpiece heating cavity, a heating coil positioned on the rear side of said cavity, upper and lower workpiece stops secured behind said cavity, and means for assembling said blocks, coil and stops on said support, said upper stop being constructed of harder material relative to said lower stop, and said lower stop being constructed of electrically insulating material.

7. An electrical inductive heating unit comprising a support for said heating unit, two insulation blocks laterally displaced to form a workpiece receiving cavity, a heating coil positioned adjacent the cavity to retain a workpiece therein at unstable gravitational equilibrium, and means for assembling said blocks and coil on said support.

8. An electrical inductive heating unit comprising a support for said heating unit, two parallel insulation blocks laterally displaced to form a workpiece heating cavity, a heating coil positioned on the rear side of said cavity, workpiece stops adjacent said cavity, and means for assembling said blocks, coil and stops on said support.

HAROLD A. STRICKLAND, JR.